United States Patent
Williamson et al.

(10) Patent No.: US 6,483,914 B1
(45) Date of Patent: Nov. 19, 2002

(54) TELEPHONE FILTER ARRANGEMENT

(75) Inventors: Roger James Williamson, Herts (GB); Leslie Derek Humphrey, Harlow (GB); Bryan R Parlor, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/305,943

(22) Filed: May 6, 1999

(51) Int. Cl.$^7$ .......................... H04M 1/00; H04M 9/00; H04M 9/08
(52) U.S. Cl. ........................ 379/399.01; 379/399.02; 379/93.05; 379/406.07; 379/406.16
(58) Field of Search ..................... 379/399, 402, 379/90.01, 93.09, 93.05, 215, 350, 406.07, 406.16

(56) References Cited

U.S. PATENT DOCUMENTS

| | | | |
|---|---|---|---|
| 4,852,145 A | * 7/1989 | Bevers et al. | |
| 5,848,150 A | * 12/1998 | Bingel | 379/399 |
| 6,028,923 A | * 2/2000 | Kolb et al. | 379/216 |
| 6,144,734 A | * 11/2000 | Beeman | 379/398 |
| 6,188,750 B1 | * 2/2001 | Kiko | 379/90.01 |

\* cited by examiner

Primary Examiner—Forester W. Isen
Assistant Examiner—Ramnandan Singh
(74) Attorney, Agent, or Firm—Lee, Mann, Smith, McWilliams, Sweeney & Ohlson

(57) ABSTRACT

A subscriber's telephone installation comprises a plurality of telephone sets coupled in parallel to a subscriber loop so as to provide a voice facility, and a data modem coupled to the subscriber loop so as to provide data facilities at a frequency above that employed for said voice facility. Some or preferably all telephone sets are provided with a respective filter arrangement incorporating series connected inductive and parallel connected capacitive elements for rejecting selected frequencies from the telephone set. The filter also incorporates a switch responsive to current drawn from the line for selectively enabling and disabling the filter arrangement when the telephone set is respectively in its off-hook condition or in its on-hook condition.

3 Claims, 6 Drawing Sheets

TELEPHONE FILTER ARRANGEMENT

FIELD OF THE INVENTION

This invention relates to communications networks and in particular to the construction and use of filters for coupling telephone sets to a subscriber loop. The invention further relates to a method of interference suppression in a subscriber's telephone installation.

BACKGROUND OF THE INVENTION

Many telephone subscribers have a number of telephone sets coupled in parallel to a single subscriber loop so that the subscriber can make and receive calls at a number of locations within his premises. In normal use, only one telephone set will be in use at any one time, the other sets remaining on hook.

Many telephone subscribers now have data facilities, for example ADSL or VDSL services coupled to the subscriber loop via a modem at the subscriber station. These modems use frequencies above the normal voice or POTS frequencies so that normal telephony can co-exist on the subscriber loop with the data service. It will, of course, be appreciated that telephone designs take no account of input impedance above the normal POTS frequency of about 4 kHz. This has been found to present problems when the phone is used on a line carrying data traffic. When the telephone is off-hook, the data signal can get into the telephone and, as a result of non-linearity, be converted down into the voice band so as to appear as noise on the line. Further, the impedance of the line changes at these higher frequencies altering the telephone hybrid balance and hence the near end cross-talk (NEXT) response. In addition, in the process of going from on-hook to off-hook, the current drawn from the line can cause a high frequency transient that causes errors in the data transmission.

To address these problems, it has been proposed to provide a telephone set with a filter, typically an LC filter, to remove or block unwanted voice band frequencies. It will be appreciated, however, that the characteristics of such a filter are dependent upon the on-hook or off-hook condition of the telephone set to which that filter is connected. When the telephone set is off-hook, the low impedance of the telephone set correctly terminates the filter which can then perform its intended function of blocking data signals from the telephone voice circuits. However, when the telephone set is in its on-hook condition, the filter is presented with a very high terminating impedance. This introduces the undesirable characteristic of very low input impedances at frequencies determined by the values of the inductors and capacitors used to construct the filter. This has now become a significant problem because of the increasingly common practice of coupling a number of telephone sets to a subscriber loop in parallel in a subscriber installation. The filters coupled between each telephone and the subscriber loop will also be effectively arranged in parallel and, apart from the particular telephone set that is currently in use in its off-hook condition, the remaining filters will be effectively unterminated. These unterminated filters will thus present very low impedances at voice frequencies thus impairing the effective operation of the off hook telephone set currently in use.

SUMMARY OF THE INVENTION

An object of the invention is to minimise or to overcome the above disadvantage.

A further object of the invention is to provide an improved filter arrangement whereby to facilitate the parallel operation of a number of telephone sets.

A further object of the invention is to provide an improved method of interference suppression in a telephone subscriber's installation.

According to a first aspect of the invention, there is provided a filter arrangement for coupling a telephone set to a subscriber loop, the arrangement comprising a filter circuit for rejecting selected frequencies from the telephone set, said filter being so constructed as to perform its filtering function only when the telephone set to which it is connected is in its off-hook low impedance condition.

According to a further aspect of the invention, there is provided a filter arrangement for coupling a telephone set to a subscriber loop, the arrangement comprising a filter circuit incorporating series connected inductive and parallel connected capacitive elements for rejecting selected frequencies from the telephone set, and switch means responsive to current drawn from the line for selectively enabling and disabling the filter arrangement when the telephone set is respectively in its off-hook condition or in its on-hook condition.

According to another aspect of the invention, there is provided a subscriber's telephone installation, comprising a plurality of telephone sets coupled in parallel to a subscriber loop so as to provide a voice facility, and a data modem coupled to the subscriber loop so as to provide data facilities at a frequency above that employed for said voice facility, wherein some or all said telephone sets are provided each with a respective filter arrangement for rejecting selected frequencies, each said filter arrangement being so constructed as to perform its filtering function only when the telephone set to which it is connected is in its off-hook low impedance condition.

According to another aspect of the invention, there is provided a subscriber's telephone installation, comprising a plurality of telephone sets coupled in parallel to a subscriber loop so as to provide a voice facility, and a data modem coupled to the subscriber loop so as to provide data facilities at a frequency above that employed for said voice facility, wherein some or all said telephone sets are provided each with a respective filter arrangement incorporating series connected inductive and parallel connected capacitive elements for rejecting selected frequencies from the telephone set, and switch means responsive to current drawn from the line for selectively enabling and disabling the filter arrangement when the telephone set is respectively in its off-hook condition or in its on-hook condition.

According to a further aspect of the invention, there is provided a method of interference suppression in a subscriber's telephone installation, comprising a plurality of telephone sets coupled in parallel to a subscriber loop so as to provide a voice facility, and a data modem coupled to the subscriber loop so as to provide data facilities at a frequency above that employed for said voice facility, wherein some or all said telephone sets are provided each with a respective filter arrangement for rejecting selected frequencies; the method comprising enabling that filter associated with a said telephone only when that telephone is in use its off-hook low impedance condition.

BRIEF DESCRIPTION OF THE DRAWINGS

Embodiments of the invention will now be described with reference to the accompanying drawings in which.

DESCRIPTION OF PREFERRED EMBODIMENTS

Figure 1:
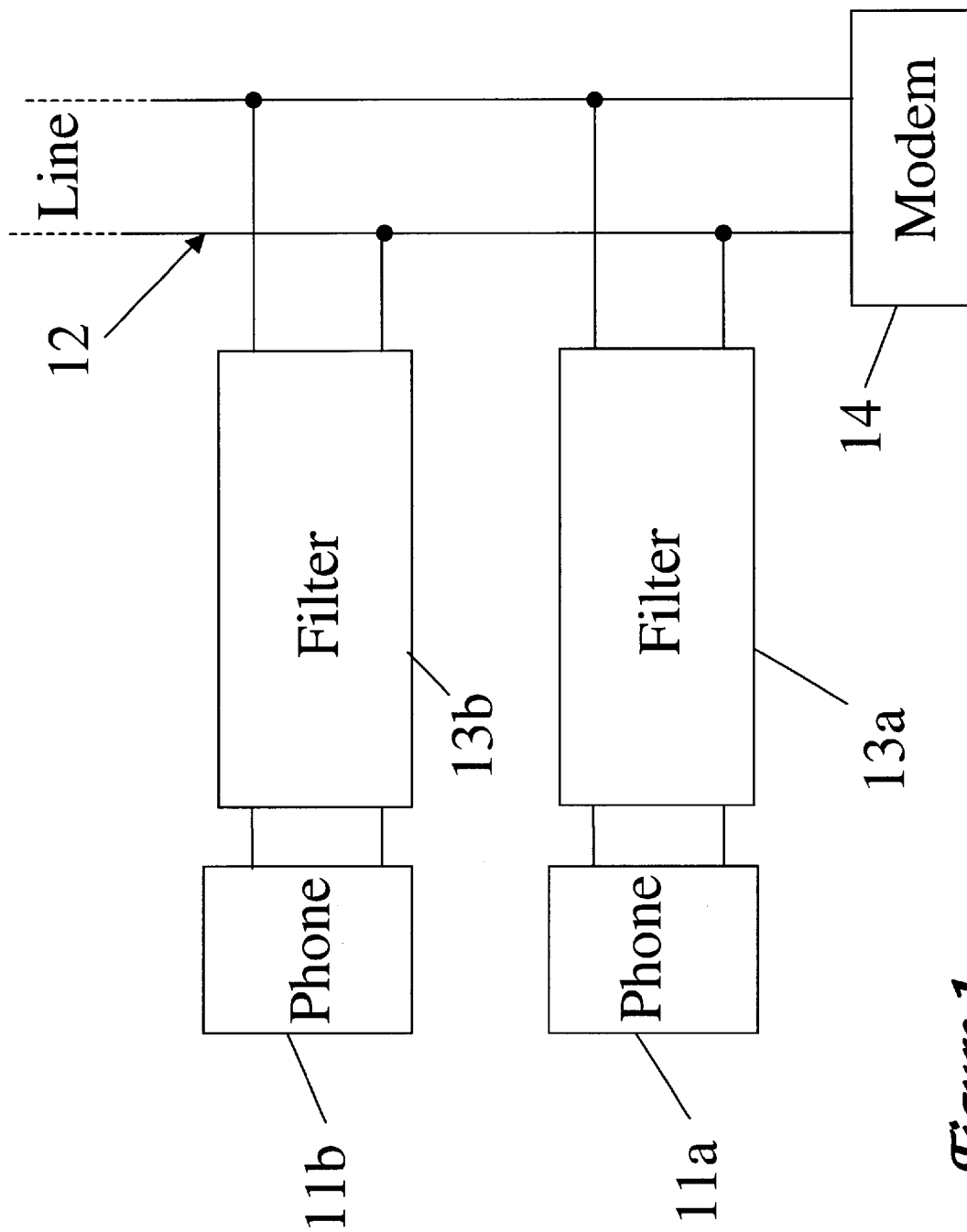
FIG. 1 is a schematic diagram of a subscriber's installation according to a preferred embodiment of the invention.

Referring first to FIG. 1, this shows in schematic form a subscriber's telephone installation comprising a number of telephone sets 11a, 11b, coupled in parallel across the legs of a subscriber loop 12. Each telephone set is provided with a respective filter 13a, 13b, which may comprise a discrete component assembly coupled between the set and the line, or it may be built into the set itself. The loop 12 is also coupled to a modern 14 whereby the subscriber is provided with a data facility, for example an ADSL or VDSL facility. The subscriber loop thus carries voice traffic in a voice frequency band, and data traffic in a frequency band above the voice band. In the arrangement of FIG. 1, each filter is constructed so that it performs its filtering function only when the telephone set to which it is connected is in its off-hook condition. Thus, in normal use, only one filter will be currently active while those filters that are connected to the remaining on-hook telephones will be disabled.

Effectively, the filter circuit is enable only when the telephone set to which it is connected is in its off-hook (low impedance) condition, and is disable when that telephone set is in its on-hook (high impedance) condition so that in an installation comprising a number of parallel connected telephone sets, only that filter that is coupled to a set currently in use, i.e. off-hook, will be in an active condition and enabled to perform a filtering function.

Preferably, the filter is integral with the telephone set rather than being provided as a separate external component. In further embodiment, the filter may be provided within a telephone socket whereby a telephone is connected to the line.

Each filter 13a, 13b, . . . comprises a network incorporating inductive and capacitive elements in e.g. a lattice or mesh arrangement. It will thus be appreciated that although, for clarity, the various embodiments described herein show a single inductor and a single capacitor, filter circuit arrangements embodying a plurality of these components are also envisaged.

Figure 2:
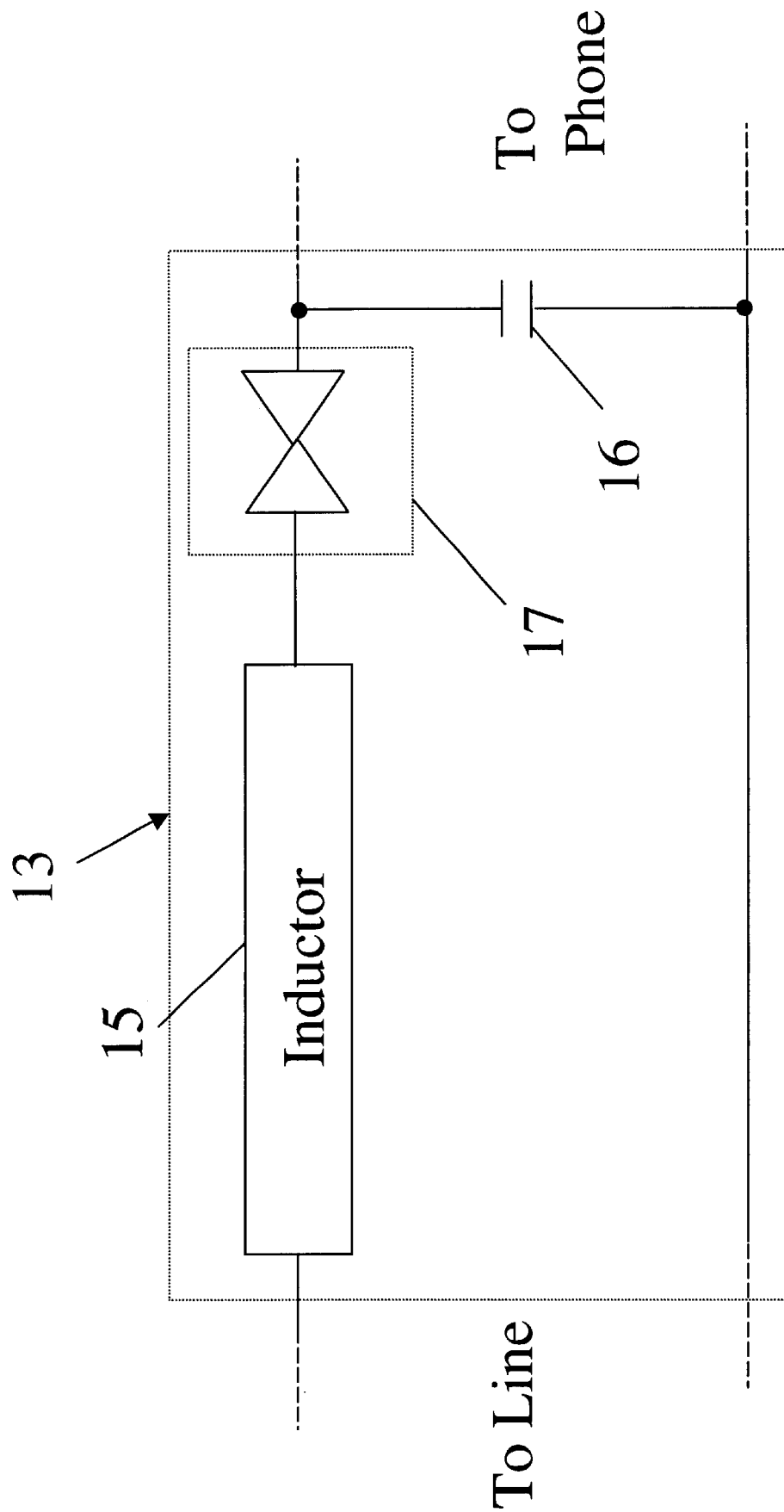
FIG. 2 shows a preferred filter arrangement for use in the subscriber's installation of FIG. 1.
Figure 3:
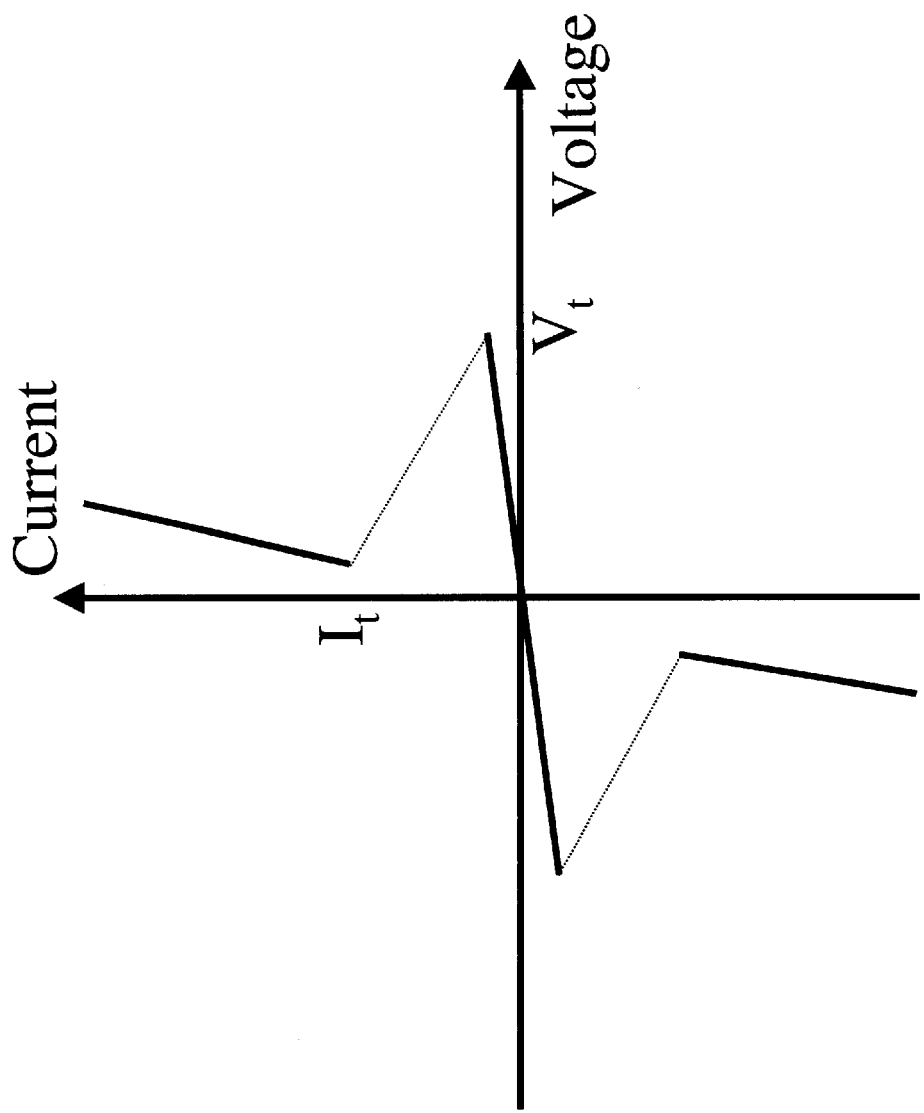
FIG. 3 shows a typical current/voltage characteristic of a semiconductor bi-state switch employed in the filter arrangement of FIG. 2.

In a preferred arrangement depicted in FIG. 2, the filter 13 comprises an inductor 15 in series with the telephone set and a capacitor 16 in parallel with the set, the values of these components being selected to block out interfering frequencies when the telephone set is in use in its off-hook low impedance condition. In the exemplary embodiment of FIG. 2, a semiconductor bi-state switch 17 is placed in series with the inductor 17 and performs the function of enabling or disabling the filter dependent on whether the telephone to which it is connected is in its off-hook or on-hook condition respectively As illustrated in FIG. 3, the semiconductor bi-state switch 17 has a first high impedance state and a second low impedance state, switching from the first to the second state being effected by the application of a voltage greater than a threshold voltage $V_t$ across the device terminals. The device can be held in this second, low impedance state by passage of a current through the device. When this current falls below a minimum threshold value $I_t$, the device reverts to its first high impedance condition.

A suitable device for this purpose is the Techor HS10 or HS20. The bi-directional nature of the device accommodates reversals of line polarity. Alternatively, a pair of back to back silicon controlled rectifiers (SCR), such as the 2N5064 device, may be used to perform this function.

When the telephone set (FIG. 2) is in its off-hook condition presenting a low impedance to the line, a voltage greater than the threshold voltage is developed across the device or switch 17 causing the device to switch to its low impedance condition allowing line current to flow and also allowing the filter to perform its required function of blocking unwanted frequencies from the telephone set. When the telephone set is in its on-hook condition presenting a high impedance to the line, the current is no longer drawn and the switch is released from its low impedance condition so as to return to its high impedance condition thus disabling the filter.

It will also be appreciated that the switch 17 will allow the passage of ring voltage from the line to the telephone.

Figure 4:
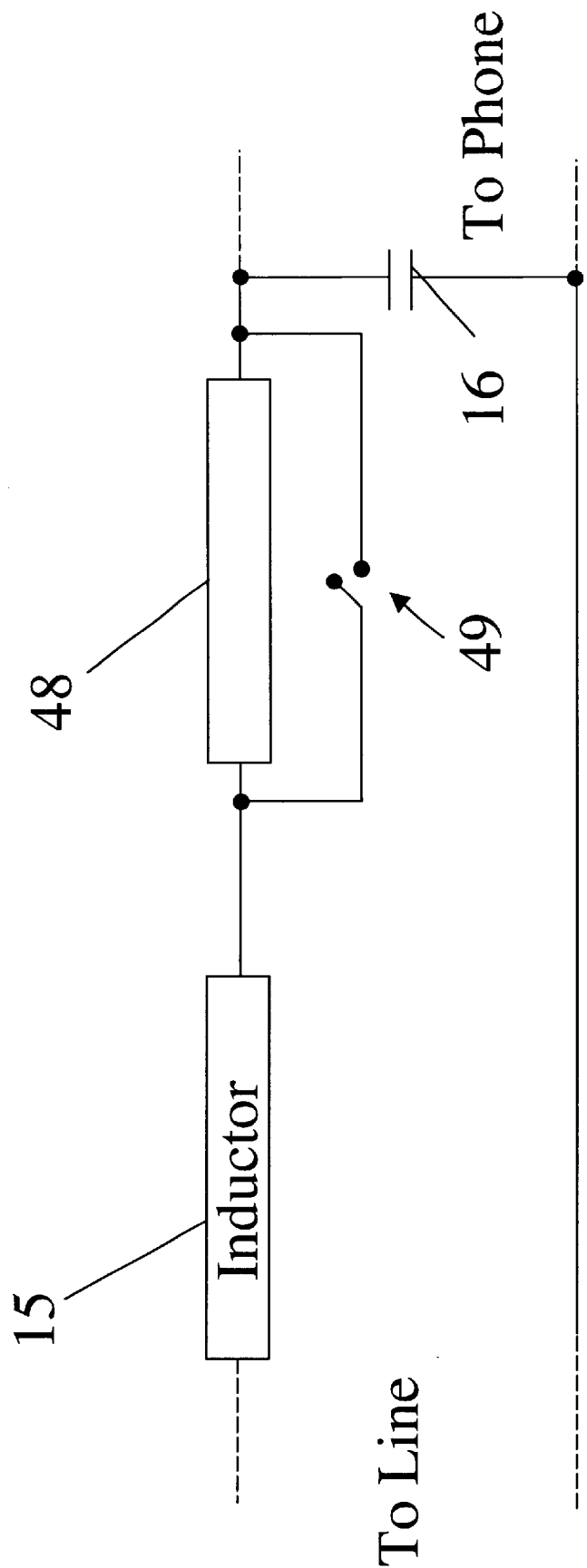
FIG. 4 shows an alternative filter arrangement.

A further filter construction is illustrated in FIG. 4. In this arrangement, a resistor 48 is placed in series with the inductor 15 and is shunted by a switch 49, the switch being responsive to the on-hook or off-hook condition of the telephone set. The switch is closed when the telephone is in its off-hook condition so as to short out the resistor 48 enabling the filter to perform its required function.

Figure 5:
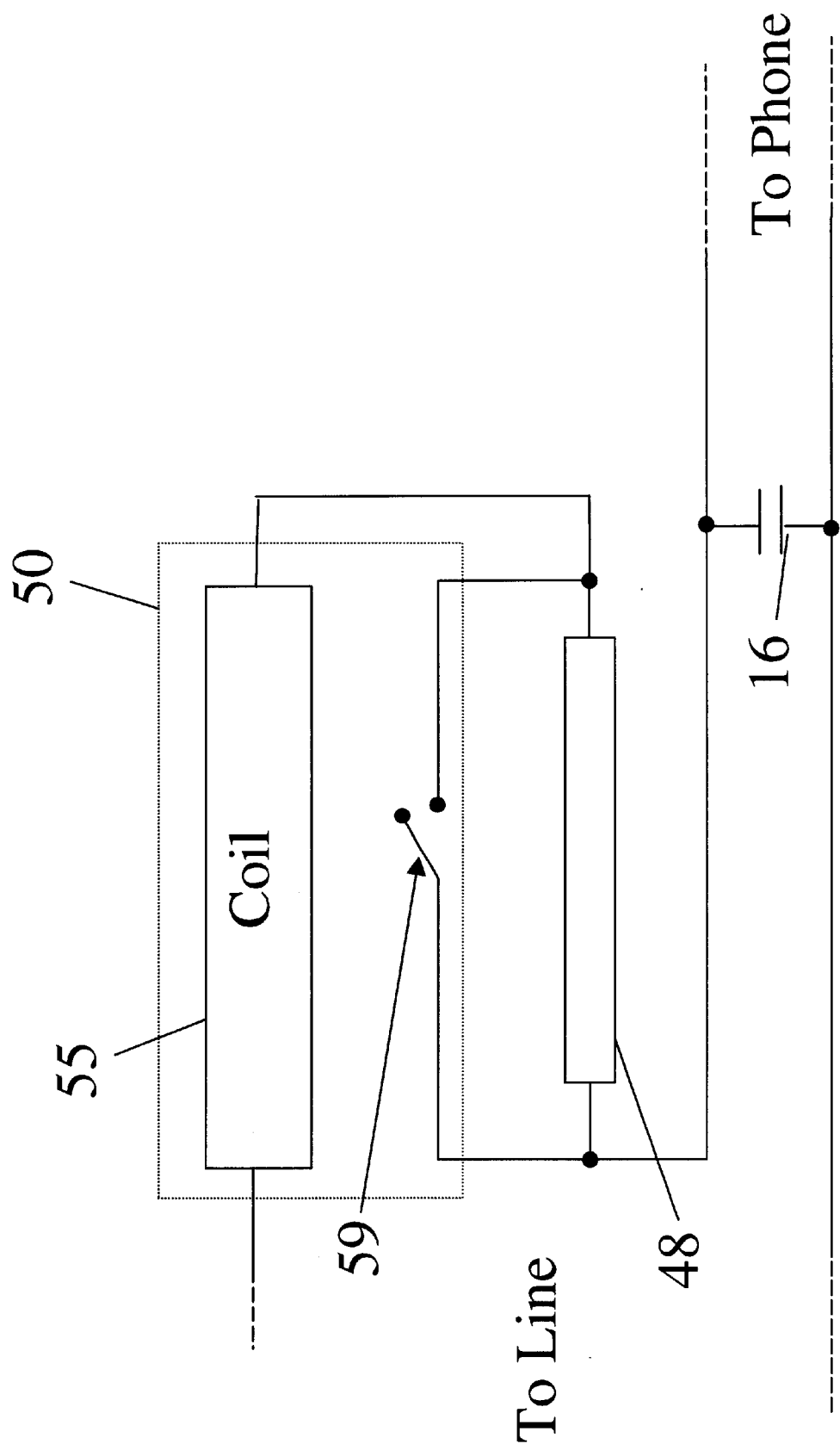
FIG. 5 shows a modification of the filter arrangement of FIG. 4.

A development of the filter arrangement of FIG. 4 is depicted in FIG. 5. In this arrangement, the inductor comprises the coil 55 of relay 50 whose contacts comprise the switch 59 connected across the resistor 48. When the telephone set is in its off-hook condition drawing current from the line, this current flows through the relay coil causing the switch contacts 59 to close and short out the resistor 48 so that the filter circuit can perform the required filtering function. When the telephone set is in its on-hook condition, drawing substantially no current from the line and thus drawing substantially no current through the relay coil, the switch contacts 59 are released so as to bring the resistor 48 into circuit so as to disable the operation of the filter.

A suitable relay for this purpose is the Type BT55 telephone line current sensing reed relay marketed by Erg Components.

In some applications, the function of the resistor 48 may be performed by an alternative component structure, e.g. a pair of back to back Zener diodes.

In the case of a resistor being used, the resonances of the input impedance of the filter circuit are heavily attenuated when the resistor is in circuit. In the case of back to back Zener diodes, the filter is completely blocked for signals below the Zener voltage. However, the ringing voltage and the off-hook voltage can still be transmitted via the line to the telephone set to enable the set to perform its normal functions.

Figure 6:
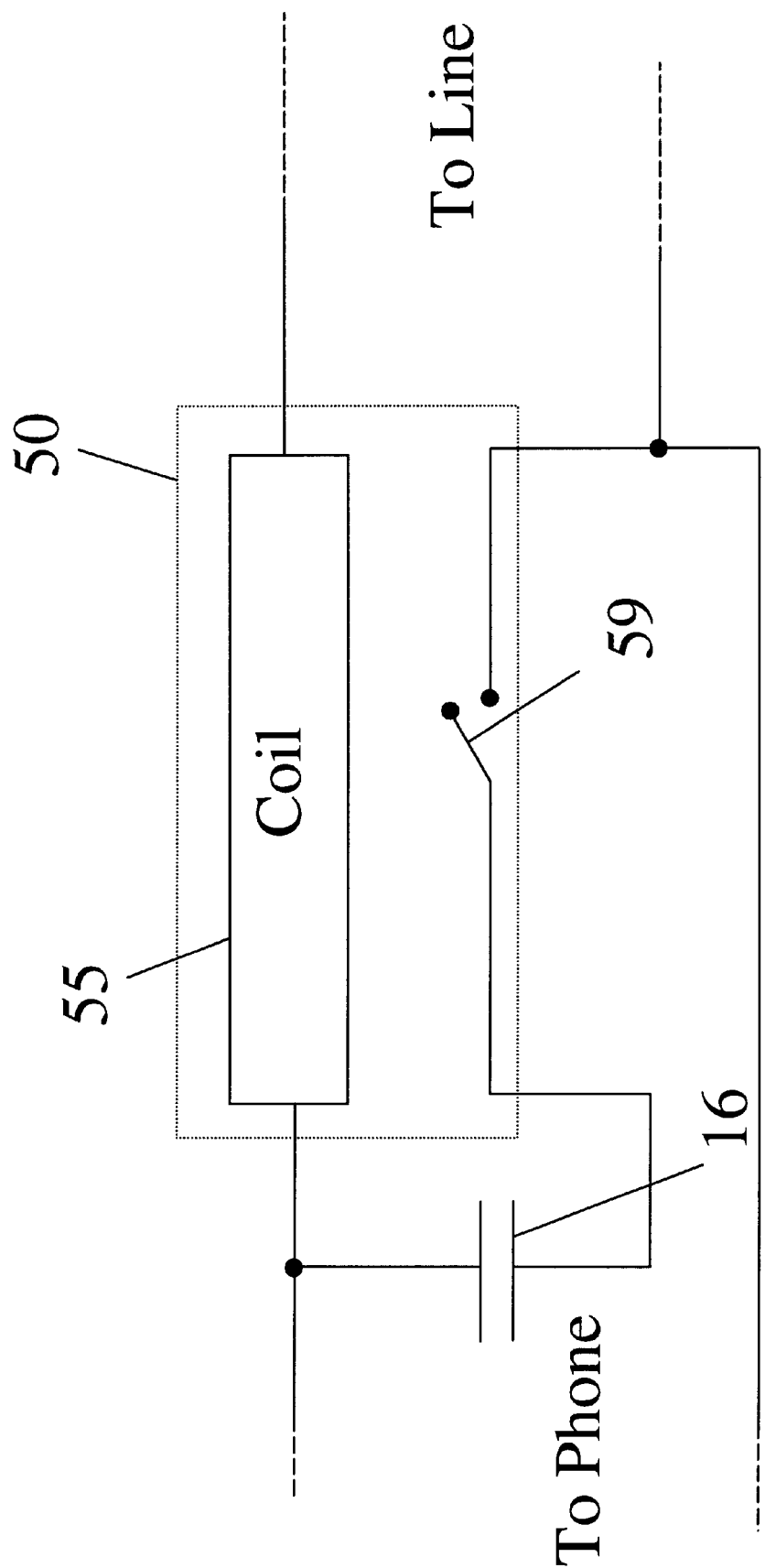
FIG. 6 shows a further filter arrangement.

In a further embodiment shown in FIG. 6, the need for a resistive component in series with the inductor is dispensed with. In this arrangement, the current sensing coil of the relay is coupled in the series arm of the filter, but the relay contacts 59 are in series with the shunting capacitor 16 of the filter. When substantially no line current is being drawn, the relay contacts 59 are open and the capacitor 16 is disconnected from circuit and hence cannot resonate with the inductance of the filter. When line current is drawn through the relay coil as a result of the telephone being taken off hook, the relay contacts 59 close thus connecting the capacitor 16 back into circuit so that the filter performs its required rejection function.

It will be understood that the above description of a preferred embodiment is given by way of example only and that various modifications may be made by those skilled in the art without departing from the spirit and scope of the invention.

What is claimed is:

1. A filter arrangement for coupling a telephone set to a subscriber loop carrying both voice and data traffic so as to remove unwanted voice band frequencies when the telephone set is in its of-hook condition and to inhibit interference with similar sets connected in parallel with the telephone set when the telephone set is in its on-hook condition, the filter arrangement comprising: an inductor coupled in series with the telephone set; a capacitor coupled in parallel with the telephone set; and switch means coupled in series with the inductor, wherein said switch means is constituted by a semiconductor bi-state switch having a first high impedance state and a second low impedance state achieved by application of a threshold voltage to the device and passage of a threshold current therethrough, said bi-state switch being responsive to the telephone line voltage and line current so as to present a low impedance to the line when the telephone set is in its off-hook condition and a high impedance to the line when the telephone set is in its on-hook condition.

2. A filter arrangement as claimed in 1, and incorporating a resistive element in series with the line, said switch means being arranged to short said resistive element so as to enable the filter arrangement when the telephone set to which it is connected is in its off-hook low impedance condition.

3. A subscriber's telephone installation, comprising a plurality of telephone sets coupled in parallel to a common subscriber loop so as to provide a voice facility to the subscriber, and a data modern coupled to the subscriber loop so as to provide data facilities to the subscriber at a frequency above that employed for said voice facility, wherein each said telephone set is provided with a respective filter arrangement constituted by an inductor coupled in series with the telephone set; a capacitor coupled in parallel with the telephone set; and switch means coupled in series with the inductor, wherein said switch means is constituted by a semiconductor bi-state switch having a first high impedance state and a second low impedance state achieved by application of a threshold voltage to the device and passage of a threshold current therethrough, said bi-state switch being responsive to the telephone line voltage and line current so as to present a low impedance to the line when the telephone set is in its off-hook condition and a high impedance to the line when the telephone set is in its, on-hook condition.

\* \* \* \* \*